Oct. 15, 1974 W. MERTENS 3,841,959

INSULATING TAPE FOR THE MANUFACTURE OF AN INSULATING JACKET FOR ELECTRIC CONDUCTORS IMPREGNATED WITH A THERMOSETTING EPOXY RESIN-ACID ANHYDRIDE CURING MIXTURE

Filed Aug. 10, 1972

United States Patent Office 3,841,959

Patented Oct. 15, 1974

3,841,959

INSULATING TAPE FOR THE MANUFACTURE OF AN INSULATING JACKET FOR ELECTRIC CONDUCTORS IMPREGNATED WITH A THERMOSETTING EPOXY RESIN-ACID ANHYDRIDE CURING MIXTURE

Willi Mertens, Berlin, Germany, assignor to Siemens Aktiengesellschaft, Munich, Germany Filed Aug. 10, 1972, Ser. No. 279,384
Claims priority, application Germany, Aug. 20, 1971, P 21 42 571.8
Int. Cl. B32b *5/16*
U.S. Cl. 161—163 16 Claims

ABSTRACT OF THE DISCLOSURE

An insulating tape for the manufacture of an insulating jacket to be impregnated with a thermosetting epoxy resin-acid anhydride mixture which includes a binder-accelerator mixture which is self-curing at the curing temperature of the impregnating resin and which produces insulation of high thermal dimensional stability, and which contains, in addition, adducts of vinyl cyclohexenedioxide and secondary amines and adducts of vinyl cyclohexenedioxide and imidazoles not substituted in the 1-position.

BACKGROUND OF THE INVENTION

Field of the Invention

This invention relates to an electrical insulating tape for the manufacture of an insulating jacket, which jacket is adapted for use on the winding conductors and coils of electric machines and the like. More particularly, this invention relates to an electrical insulating tape which resists thermo-elastic softening of the insulating tape and of the insulating jacket at the high operating temperatures of electric machines. Still more particularly, this invention relates to an insulating tape for the manufacture of an insulating jacket which is adapted to be impregnated with a thermosetting epoxy resin-acid anhydride mixture.

DESCRIPTION OF THE PRIOR ART

The electrical insulating tapes of the prior art have binder-accelerator mixtures which are chosen so that no setting of the mixture takes place at room temperatures. Thus, these insulating tapes can be stored as long as desired prior to impregnation. As disclosed in German Patent 1,801,053, it is advisable that the binder-accelerator mixture be a self-curing system. However, the binder-accelerator mixture should be self-curing only at the curing temperatures of the impregnating resin, which temperatures are considerably above room temperature. This prevents that portion of the binder which has penetrated between the large-area layers of the breakdown-resistant inorganic material, and which the impregnating resin has not been able to re-absorb completely, from remaining in the insulation in an uncured condition.

The binders known in the prior art consist of polymerizable adducts of acid components which contain at least one polymerizable double bond and epoxy compounds to which organic peroxides are admixed which cause the unsaturated molecular areas of the binder and the accelerator to be polymerized at the curing temperature of the impregnating resin. Cycloaliphatic epoxy resins with an epoxy-equivalent weight of below 180 are used for this purpose in which the epoxy groups were produced by oxygen attachment to double bonds in the ring.

It has been found possible to improve the utilization of electric machines substantially through the use of high-quality insulation. But, the problem is to find a binder-accelerator mixture for the insulating tape used in the insulation which has a thermal dimensional stability as high as possible so that even at high operating temperatures of the electric machine, such as in insulation Class F., no thermo-elastic softening of the insulation occurs.

SUMMARY OF THE INVENTION

This invention relates to an electrical insulating tape for the manufacture of an insulating jacket. The insulating jacket is adapted for use on the winding conductors and coils of electric machines. The insulating jacket is wound on such winding conductors and coils and is then impregnated with a thermosetting epoxy resin-acid anhydride mixture. The insulating tape comprises a flexible substrate; an areal, inorganic material of high dielectric strength applied to the substrate; a binder which cements the areal, inorganic material to the substrate; and an accelerator in mixture with the binder. The accelerator acts to stimulate the curing action of the impregnating epoxy resin-acid anhydride mixture. The binder-accelerator mixture forms a self-curing system at the curing temperature of the impregnating resin, using cycloaliphatic epoxy resins with an epoxy-equivalent weight of under 180, in which the epoxy groups have been produced through oxygen attachment at double bonds in the rings. In addition, the binder-accelerator mixture also comprises:

adducts of vinyl cyclohexenedioxide and secondary amines, in which the secondary nitrogen atom is a member of a hydrogenated ring with the molar ratio of 1:1; and adducts of vinyl cyclohexenedioxide and imidazoles not substituted in the 1-position, with a molar ratio of 1:1.

When the impregnated insulation is cured, even in the case where it has not been re-absorbed by the impregnating resin, such a binder-accelerator mixture yields a material with a thermal dimensional stability according to Martens of over 100°. However, since in the manufacture of the insulation the major part of the binder-accelerator mixture mixes over a wide range of mixtures with the portion of the impregnating resin which penetrates with the portion of the impregnating resin which penetrates into the insulation jacket, materials with a thermal dimensional stability of over 130° are obtained after the insulation has set. Even in electric machines in insulation Class F., this is sufficient to suppress mechanical movements in the winding and in the winding heads.

DETAILED DESCRIPTION

Figure 1:
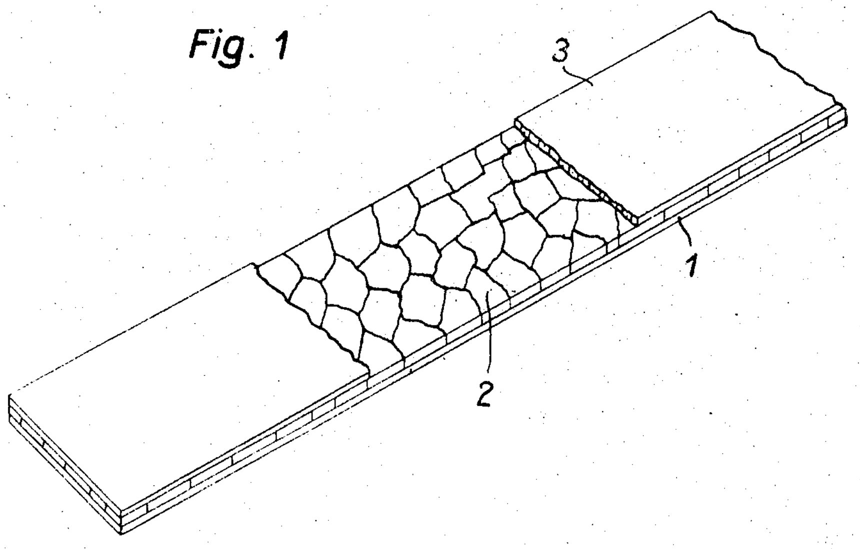
FIG. 1 is an isometric view of a section of insulating tape according to this invention.

This electrical insulating tape of this invention is used for the manufacture of an insulating jacket which is adapted for use on the winding conductors and coils of electric machines. The insulating jacket is wound on such winding conductors and coils and is then impregnated with a thermosetting epoxy resin-acid anhydride mixture. The insulating tape comprises a flexible substrate; an areal inorganic material of high dielectric strength applied to the substrate; a binder which cements the areal, inorganic material to the substrate; and an accelerator in mixture with the binder. The accelerator acts to stimulate the curing action of the impregnating epoxy resin-acid anhydride mixture. The binder-accelerator mixture forms a self-curing system at the curing temperature of the impregnating resin, using cycloaliphatic epoxy resins with an epoxy-equivalent weight of under 180, in which the epoxy groups have been produced through oxygen attachment at double bonds in the rings. In addition, the binder-accelerator mixture also includes:

adducts of vinyl cyclohexenedioxide and secondary amines, in which the secondary nitrogen atom is a member of a hydrogenated ring with the molar ratio of 1:1; and
adducts of vinyl cyclohexenedioxide and imidazoles not substituted in the 1-position, with a molar ratio of 1:1.

Optionally, a cover layer may be cemented to the areal, inorganic material of high dielectric strength on the opposite side of said material of high dielectric strength from the side to which the substrate is cemented.

Insulating tape according to this invention can be stored at room temperature for more than three months without change of its properties. The binder-accelerator mixture remains fully and reliably souble in the impregnating resin under conditions of drying and preheating prior to the impregnation of the insulation. Furthermore, since the components of the binder-accelerator mixture have molecular weights of over 200, there is no danger that the thermosetting epoxy resin-acid anhydride mixture will be affected by vapors of components from the binder-accelerator mixture, which might have an accelerating and activating effect.

It has been found that the binder-accelerator mixture may have the following ranges of components:

60 to 80 percent by weight of a cycloaliphatic epoxy resin with an epoxy-equivalent weight of under 180, where the epoxy groups were produced by oxygen attachment at double bonds in the ring;

19 to 39 percent by weight of an adduct of vinyl cyclohexenedioxide and secondary amines wherein the secondary nitrogen atom is a member of the hydrogenated ring system with a molar ratio of 1:1; and 1 to 15 percent by weight of an adduct of vinyl cyclohexenedioxide and imidazoles not substituted in the 1-position with a molar ratio of 1:1.

The curing speed of the binder-accelerator mixture contained in the insulating tape can be influenced substantially by the ratio of the amine adduct to the imidazole adduct. Moreover, the activity of the imidazole adducts are influenced by the substituent in the imidazole. It is, for instance, advantageous to use in the binder-accelerator mixture 7 to 15 percent by weight of 2-isopropyl imidazole adduct. An insulating tape with maximum storage life is thereby obtained, which however, reacts somewhat more slowly during setting, as the effect of the 2-isopropyl-imidazole adduct as a polymerization catalyst is less. If, however, 2-ethyl imidazole adduct is used in the binder-accelerator mixture, 1 to 7 percent by weight are sufficient because of the higher accelerator action. Mixtures of both substances, 2-ethyl imidazole adducts and 2-isopropyl imidazole adducts, can also be used in the binder-accelerator mixture.

In the manufacture of the insulating tape, the percenage of binder should not be chosen too high, so that the impregnating resin can penetrate thoroughly into the voids in the tape during impregnation. The percentage by weight of the binder relative to the total weight of the insulating tape should be approximately 3 to 10%. With such a percentage of binder, the percentage by weight of the accelerator relative to the total weight of the insulating tape should be approximately 0.1 to 3%. The amount of accelerator added to the insulating tape during manufacture depends on how much inorganic material, such as mica, the tape contains per substrate. It also depends on how high the percentage of the binder, used for cementing, is in the insulating material.

Referring to FIG. 1, the insulating tape illustrated in FIG. 1 has a flexible substrate 1 made of a synthetic-fiber fabric a few $\mu$ thick. However, a woven fabric, such as fiberglass or plastic film, particularly one which has a high heat resistance, can also be used as the substrate 1. A layer 2 of mica flakes is applied to the substrate 1. Mica paper or glass flakes can also be applied instead of the mica flakes. The layer 2 may be sealed by a cover layer 3 which may consist of the same material as the substrate 1. It is also possible to select different flexible materials for the substrate 1 and the cover layer 3. If mica paper is used, the cover layer 3 may be omitted.

An accelerator-containing binder for cementing the insulating tape comprises:

70 percent by weight of a cycloaliphatic epoxy resin with an epoxy equivalent weight of 150, in which the epoxy groups are produced by oxygen attachment at double bonds at the ring;
27 percent by weight of the morpholine adduct to vinyl cyclohexenedioxide; and
3 percent by weight of the 2-ethyl imidazole adduct to vinyl cyclohexenedioxide.

The insulating tape prepared in this manner can be stored for more than three months at 25° C.

Figure 2:
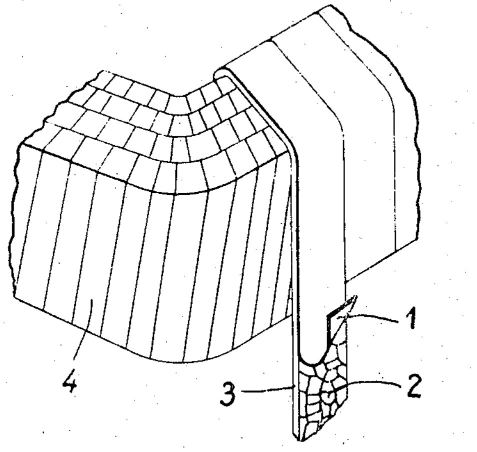
FIG. 2 is an isometric view of a winding conductor having an insulating jacket made from the insulating tape of FIG. 1.

Referring to FIG. 2, which illustrates the insulating jacket of a winding conductor of an electric machine, the insulating tape shown in FIG. 1 is wrapped around the winding conductor 4 of an electric machine. After the winding conductor 4 is wrapped with the insulating tape, and an external glow discharge shield is applied if desired, the conductor 4, thus wrapped and, if desired, dried, is impregnated under vacuum with a thermosetting epoxy-resin impregnating mixture with a base of bi- or higher-function glycidyl ethers or epoxy compounds, respectively, and acid anhydrides. The impregnating temperature is about 60 to 70° C. in order to assure that the viscosity of the epoxy-resin impregnating mixture is as far as possible less than 30 cp. during the impregnation and that the insulating jacket wound on the winding conductor 4 is completely saturated. The excess impregnating resin mixture is subsequently pumped back. It can be re-used for as many impregnating cycles as desired, as its pot life is many times the time required for one impregnating cycle. In the curing of the insulating jacket there is assurance through the particular choice of the binder that all points are cured, i.e., also points where the binder was not reabsorbed by the impregnating resin, since the binder is self-curing. An insulation is therefore obtained with very good electrical properties and high thermal dimensional stability.

The adhesion properties of the binder-accelerator mixture developed according to this invention can also be matched in an appropriate manner to the respective substrate used by the addition of inorganic or organic thickeners. As an inorganic thickener, highly dispersed silica can, for example, be used. As organic thickeners, thermoplastic materials soluble in the binder-accelerator mixture are used, such as polyvinylbutyral, styrolacrylnitrilepolymerisate or polysulfone resins. Up to about 5% of the binder-accelerator mixture can be added of these thickeners.

In the foregoing specification, the invention has been described in reference to a specific exemplary embodiment. It will be evident, however, that variations and modifications in the embodiment explained by way of illustration may be made without departing from the broader scope and spirit of the invention as set forth in the appended claims. The specification and drawings are accordingly to be regarded in an illustrative rather than in a restrictive sense.

What is claimed is:

1. An improvement in an insulating tape for the manufacture of an insulating jacket, said insulating tape being adapted for use on the winding conductors and coils of electric machines where said insulating tape is wound on said winding conductors and coils and then impregnated with a thermosetting epoxy resin-acid anhydride mixture, said insulating tape comprising:

(a) a flexible substrate;

(b) an areal, inorganic material of high dielectric strength applied to said substrate;

(c) a binder which cements said areal, inorganic material to said substrate;

(d) an accelerator in mixture with said binder, said accelerator acting to stimulate the curing reaction of the impregnating epoxy resin-acid anhydride mixture, said binder-accelerator mixture forming a self-curing system at the curing temperature of the impregnating resin, using cycloaliphatic epoxy resins with an epoxy-equivalent weight of under 180, in which the epoxy groups have been produced through oxygen attachment at double bonds in the ring, said binder-accelerator mixture additionally comprising:

(e) adducts of vinyl cyclohexenedioxide and secondary amines, in which the secondary nitrogen atom is a member of a hydrogenated ring, with the molar ratio of 1:1; and (f) adducts of vinyl cyclohexenedioxide and imidazoles not substituted in the 1-position, with a molar ratio of 1:1, wherein said binder-accelerator mixture comprises about 60 to 80% by weight of said cycloaliphatic epoxy resin, about 19 to 39% by weight of said adduct of vinyl cyclohexenedioxide and secondary amines, and about 1 to 15% by weight of said adduct of vinyl cyclohexenedioxide and imidazoles.

2. The insulating tape according to claim 1 wherein said secondary amines are piperidine.

3. The insulating tape according to claim 1 wherein said secondary amines are morpholine.

4. The insulating tape according to claim 1 wherein said binder-accelerator mixture comprises 2-ethyl imidazole adducts.

5. The insulating tape according to claim 1 wherein said binder-accelerator mixture comprises 1 to 7% by weight of 2-ethyl imidazole adducts.

6. The insulating tape according to claim 1 wherein said binder-accelerator mixture comprises 2-isopropyl imidazole adducts.

7. The insulating tape according to claim 1 wherein said binder-accelerator mixture comprises 7 to 15% by weight of 2-isopropyl imidazole adducts.

8. The insulating tape according to claim 1 wherein said binder-accelerator mixture comprises a mixture of 2-ethyl imidazole adducts and 2-isopropyl imidazole adducts.

9. The insulating tape according to claim 1 wherein the components of said binder-accelerator mixture have molecular weights of over 200.

10. The insulating tape according to claim 1 wherein the percentage by weight of the binder relative to the total weight of the insulating tape is approximately 3 to 10%, and the percentage by weight of the accelerator relative to the total weight of the insulating tape is approximately 0.1 to 3%.

11. The insulating tape according to claim 1 wherein said insulating tape further comprises a cover layer which is cemented to the areal, inorganic material of high dielectric strength on the opposite side of said material of high dielectric strength from the side to which the substrate is cemented.

12. The insulating tape according to claim 1 wherein said binder-accelerator mixture further comprises approximately 5% of a thickener.

13. The insulating tape according to claim 12 wherein said thickener in said binder-accelerator mixture is an inorganic thickener.

14. The insulating tape according to claim 12 wherein said thickener in said binder-accelerator mixture is an organic thickener.

15. The insulating tape according to claim 1 wherein the percentage by weight of the binder relative to the total weight of the insulating tape is approximately 3 to 10%.

16. The insulating tape according to claim 1 wherein the percentage by weight of the accelerator relative to the total weight of the insulating tape is approximately 0.1 to 3%.

References Cited

UNITED STATES PATENTS

| | | | |
|---|---|---|---|
| 3,647,611 | 3/1972 | Mertens | 117—122 X |
| 3,536,654 | 10/1970 | Lantz et al. | 117—161 |

MICHAEL SOFOCLEOUS, Primary Examiner

B. D. PIANALTO, Assistant Examiner

U.S. Cl. X.R.

117—122 PF; 161—171, 184, 185; 260—78.4 EP